United States Patent
Hoffman et al.

[19]

[11] Patent Number: 5,903,895
[45] Date of Patent: May 11, 1999

[54] METHOD FOR REFORMATION CONVENTIONAL THREE FIELD DATE FORMATS TO PRODUCE A CENTURY ACCUMULATED DATE

[76] Inventors: Milton R. Hoffman, 4796 N. Woodburn Ave., Whitefish Bay, Wis. 53211-1126; Ronald C. Slatin, 412 S. Leitch Ave., La Grange, Ill. 60525

[21] Appl. No.: 08/840,385

[22] Filed: Apr. 29, 1997

[51] Int. Cl.⁶ .................................................. G06F 17/30
[52] U.S. Cl. .............................................. 707/101; 707/6
[58] Field of Search ....................... 707/101, 6

[56] References Cited

U.S. PATENT DOCUMENTS

| | | | |
|---|---|---|---|
| 5,630,118 | 5/1997 | Shaughnessy | 707/1 |
| 5,668,989 | 9/1997 | Mao | 707/101 |
| 5,719,826 | 2/1998 | Lips | 368/29 |
| 5,737,735 | 4/1998 | Soeder | 707/6 |
| 5,758,336 | 5/1998 | Brady | 707/6 |
| 5,758,346 | 5/1998 | Baird | 707/101 |
| 5,761,668 | 6/1998 | Adamchick | 707/101 |
| 5,765,145 | 6/1998 | Marsiello | 707/1 |
| 5,794,048 | 8/1998 | Brady | 707/6 |
| 5,797,117 | 8/1998 | Gregovich | 707/101 |
| 5,806,063 | 9/1998 | Dickens | 707/6 |
| 5,806,067 | 9/1998 | Conner | 707/100 |
| 5,808,889 | 9/1998 | Burgess | 364/737 |
| 5,809,500 | 9/1998 | Nolan | 707/6 |

OTHER PUBLICATIONS

The Year 2000 Computing Crises; a Millenium Data Conversion Plan, Jerome Murray, 1996.

*Primary Examiner*—Wayne Amsbury
*Attorney, Agent, or Firm*—Quarles & Brady

[57] ABSTRACT

The present invention relates to a method for reformatting and using the existing 2 digit month field and the existing 2 digit day field in a conventional 8, 7 or 6 digit date format to accommodate new century information. The invention is particularly useful for dealing with 6 digits formats used in existing databases, for example, ASCII date formats of the form mm/dd/yy or dd/mm/yy or yy/mm/dd. The method of the present invention for encoding century information is based on numerically offsetting the range of 1 through 31 days in the day field and/or offsetting the range of 1 through 12 months in the month field. In ASCII, the constraint is the value of the largest number that can be represented in 2 digit ASCII form (i.e. 99). There can be 3 day field ranges, 1–31, 32–62, 63–93 within the range 1 through 99, and there can be 8 month field ranges, 1–12, 13–24, 25–36, 37–48, 49–60, 61–72, 73–84, 85–96. Each of the embodiments manipulate the digits in these fields to produce a century accumulated date. Thus, century may be inserted into the day field, the month field, or both the day and the month field. The century can also be extracted from the century accumulated date to produce a conventional date format.

37 Claims, 13 Drawing Sheets

METHOD FOR REFORMATION CONVENTIONAL THREE FIELD DATE FORMATS TO PRODUCE A CENTURY ACCUMULATED DATE

BACKGROUND OF THE INVENTION

1. Field of the Invention

The present invention relates generally to a method for keeping track of dates when a date field exceeds its predefined limit. More specifically the present invention relates to a method for reformatting a conventional 6, 7 or 8 digit date having fields displaying the day, month, and year to accommodate new century information and for incorporating such dates into existing systems.

2. Background and Description of the Prior Art

Digital date information in the 20th century has been commonly stored in a 6 digit format, in which 2 digits represent the month, 2 digits represent the day and 2 digits represent the year. It is argued that starting with the year 2000, 7 or 8 digits must be used for date entries so that centuries can be distinguished from one another. For example, conventional systems use three basic 6 digit formats each having a day field, a month field, and a year field. These are:

1. commercial, mm/dd/yy (most widely used in the U.S. business);
2. government, yy/mm/dd (U.S. federal government standard);
3. European, dd/mm/yy (common in Europe and Canada).

In each format, mm represents a month, dd represents a day, and yy represents a year. Problems arise in these conventional 6 digit systems when a new century approaches. For example, the first year of any century is represented in the commercial format as 01-01-00 through 12-31-00. Currently, there is no way to distinguish in this 6 digit format whether the date is Jan. 1, 1900 or Jan. 1, 2000. Thus, electronic databases that keep 6 digit date information for more than 100 years can quickly become confused as to exactly which date is meant by 01-01-00.

While some have suggested solutions to this problem, see e.g., Jerome Murray, *The Year 2000 Computing Crises; a Millennium Date Conversion Plan,* 1996, such plans have been complex and do not lend themselves to easy adaptation of current 6 digit database date formats.

Some have suggested that eight digits are required for date entry starting with the year 2000, while others have suggested that at least seven digits are necessary. However, reformatting the current databases from 6 to eight or seven digits can be costly and very time consuming. Moreover, a problem still arises in the seven digit format when a new millennium approaches. Furthermore, such a conversion and method of formatting dates uses additional computer memory. This may slow the computer down and more rapidly use up the memory available within the computer to the user.

What is needed is a simple method for manipulating and using a 6 digit date formats to accommodate century information that does not totally replace the 6 digit date format.

SUMMARY OF THE INVENTION

It is an object of the present invention to allow continued use of current 6 digit (e.g. mmddyy or yymmdd) formats for dates prior to year 2000 while accommodating new century dates in a similar 6 digit format.

The present invention is a method for reformatting a conventional 8, 7, or 6 digit date format having fields containing digits which represent a month, a day, and a year. The invention allows for conversion of conventional formats to six digits without substantially altering the conventional 6 digit date format. The present invention provides a new 6 digit date format for the year 2000 and for approximately an additional 2000+ years. This inventive 6 digit date format provides database entry in the existing 6 digit date format for the years 2000 and beyond, not by horizontal expansion of the spaces, but by vertical expansion of existing date spaces. It does this by using unused digits that exist in the conventional 6 digit date entry. These unused digits are found in the spaces within the fields allowed for entry of month and day digits. The unused digits are identified as 13–99 in the conventional month field which is a two digit number that conventionally uses only the digits 01–12. The unused digits in the conventional 6 digit day format are the numbers 32–99 which usually uses only the digits 01–31. By using these unused digits in the day and the month field, the present invention can expand on the conventional 6 digit date format. The present invention does this in several different ways.

In the first embodiment of the present invention, the 6 digit date is expanded using the day field as a century accumulator. The day of month ranges from 1–31, 32–62, 63–93 and count over the days for example in the 20th, 21st, and 22nd centuries respectively. Thus, the century indicator is in the day field position. For example Jan. 1, 1900 is represented as 01/01/00. Jan. 1, 2000 is represented as 01/32/00. Similarly Jan. 1, 2100 is represented as 01/63/00. In this way, one can distinguish these dates in a database without changing the 6 digit date format within the database.

In the second embodiment, the century accumulator is in the month field. Month of year ranges include 1–12, 13–24, 25–36, 37–48, 49–60, 61–72, 73–84, 85–96 and for example count over the months from the 20th through the 27th centuries. Thus, the century indicator here is the position of the month field in the 1st through 96th month total range. Thus, the day Jan. 1, 1900 is still represented as 01/01/00 while the date Jan. 1, 2000 is represented as 13/01/00. Similarly, the date Jan. 1, 2100 is represented by 25/01/00, and the date Jan. 1, 2600 is represented as 85/01/00.

Another embodiment uses both the day and the month columns as a century accumulator by combining the embodiments described above. These count first over the day field ranges 1–31, . . . , 63–93, then over field months 13–24, 25–36, . . . , 85–96 to accommodate a total of 10 consecutive centuries, for example the 20th through the 29th.

A variation on this theme uses the month and day as century accumulators except that counting begins with the month field instead of the day field. For example as the centuries progress, the month fields progress through month 96 and then move over into the day fields and progress through day 93.

In another embodiment, the day field position (DFP) multiplied by the month field position (MFP) is used as a century accumulator and is represented by the formula 8×DFP+MFP+19=century, where DFP is day field positions [0, 1, 2] and MFP is month field positions [0, 1, 2, 3, 4, 5, 6, 7] for a total of 24 centuries, for example the 20th through the 43rd. For example, Jan. 1, 1900 is represented by 01/01/00, while Jan. 1, 2000 is represented by 13/01/00. On the other hand, Jan. 1, 2100 is represented by 25/01/00.

In another embodiment the method uses a month position multiplied by a day position as a century accumulator much like the one described above, but uses the formula 3×MFP+

DFP+19=century. Jan. 1, 1900 is represented by 01/01/00. Jan. 1, 2000 is represented by 13/01/00 while Jan. 1, 2100 is represented by 25/01/00.

Each of these embodiments allow for the tracking of time in the 6 digit date format. The inventive method of manipulating the conventional 6 digit format allows conventional computers to use databases with data stored in 6 digit formats, and it allows computers the ability to manipulate the 6 digit data contained therein well into the future. For example, if patent maintenance fees are due on a particular date in the future, that date can still be entered into the database in a 6 digit format.

Various other features, objects, and advantages of the present invention and the manner in which they are achieved will be made apparent from the following detailed description, drawings, and claims.

DETAILED DESCRIPTION OF THE PREFERRED EMBODIMENTS

The embodiments shown in the flowcharts in FIGS. 1–13 illustrate the inventive method for inserting and extracting a century indicator and accumulator. In the illustrated examples, a 2-digit ASCII day field, a 2-digit ASCII month field, or a combination of day and month fields within a 6-digit ASCII date may be used. However, it is understood that ASCII is only used for purposes of illustration and that the inventive method is not limited to only situations involving ASCII—any 4 (BCD), 7 or 8-bit display encoded representation of the digits 0–9 can be used in conjunction with this invention. Obviously, digits are used to merely represent the day, month, and year. Thus, it should be understood that the terms digit and digit representation are used interchangeably throughout to include references to a 2 digit year, 2 digit day, and 2 digit month.

In FIGS. 1–13: Cyy is 2 digit year in character format, Cmm is 2 digit month in character format, Cdd is 2 digit day in character format, Nyy is 2 digit year in computer numeric format, Nmm is 2 digit month in computer numeric format, Ndd is 2 digit day in computer numeric format, Ccc is 2 digit century representation in character format (19, 20 . . . ), Ncc is 2 digit century in numeric format (19, 20 . . . ), Cccyy is 4 digit year in char format (1988, 2005 . . . ), count N1, and N2 are variables, dcount and ND are day variables, mcount and NM are month variables, NUM( ) is the computer function for converting character representations of numbers into computer numeric format, CHAR( ) is the computer function for converting computer numeric format into character representations of numbers, ∥ means concatenate, current 6 digit date format is Cmm/Cdd/Cyy, and x←y means y is stored into x.

Figure 1:
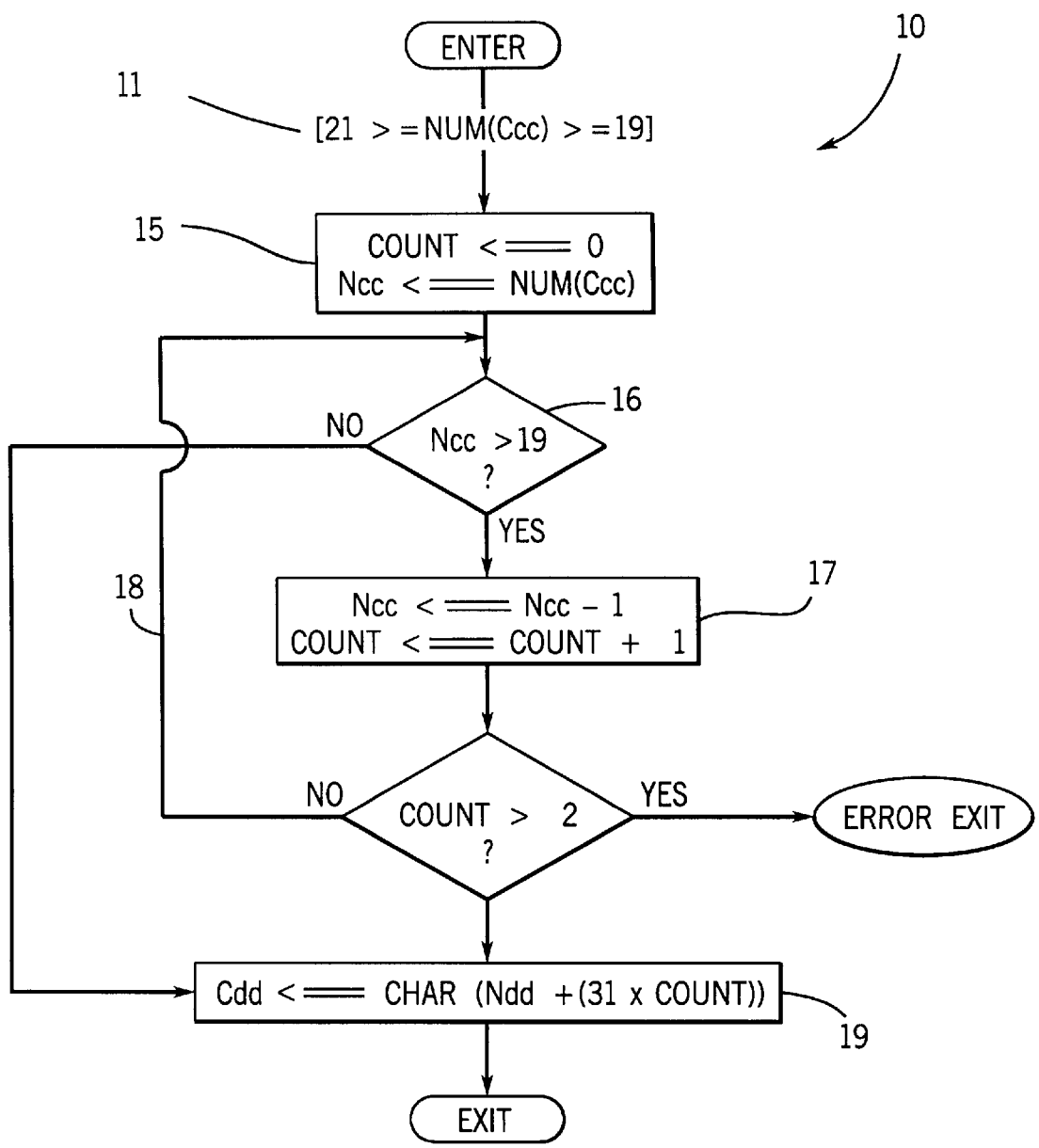
FIG. 1 is a flow chart of an insertion using the first embodiment of the present invention.
Figure 2:
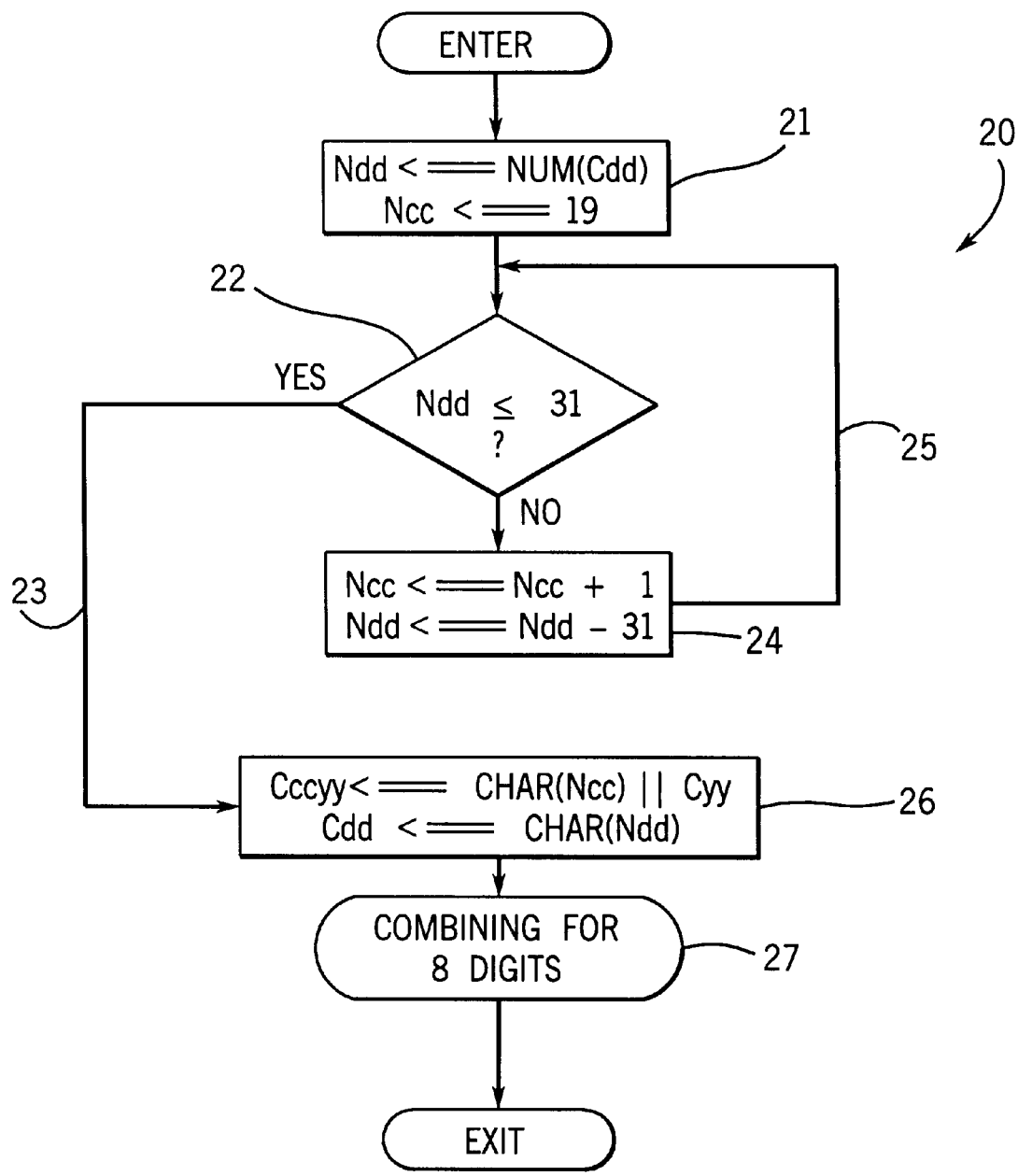
FIG. 2 is a flow chart of an extraction using the first embodiment of the present invention.

FIGS. 1 and 2 illustrate an embodiment of the present invention which accomplishes century insertion/extraction using the day field as a century accumulator. Day of month ranges 1–31, 32–62, 63–93 count over days, for example in the group of the 20th, 21st, 22nd centuries or {19, 20, 21 } for the 2 digit century representations respectively. Thus, the century indicator is the position of the day field having a 1 through 93 day total range. The position for the 20th century is 1–31, thus leaving current dates unchanged. Moreover, the fixed day offset is 31 because no month has more than 31 days.

In FIG. 1, the first embodiment shows a method of century insertion 10. During the insertion 10, the century is inserted into the day field normally represented by the digits 1–31. When using this method, the century parameters may be a field of any three consecutive centuries. In this example, the century has already been determined, for example, the 20th, 21st, and the 22nd centuries 11 are shown. Nonetheless, some methods of determining the century or century representation when only 6 digits or 7 digits are present will be discussed in the Use and Operation section below. In a first step 15 a variable or count is set equal to zero. Also in step 15, a computer generally performs an operation, i.e. NUM( ), internally so that character representations of the numbers (e.g. Ccc, Cdd, Cmm) are converted into computer numeric format (e.g. Ncc, Ndd, Nmm). In an effort to avoid confusion on this note, the character numbers will be referred to as digits throughout. However, it should be understood most computers must perform this step before any operations can take place.

The present invention's next step 16 makes a determination whether or not the century representation digits are greater than 19. If the century representation from the year field is greater than 19, the century representation is decremented by 1 and the variable or count is incremented by 1 as illustrated by another step 17. That step 17 is repeated until the century representation equals 19 or the variable is greater than 2 as shown by loop 18. Yet another step 19 is next performed by multiplying the variable by a fixed day offset, for example 31, to get a product and then adding the product to the 2 digit day. This creates a new 2 digit day or a 2 digit century accumulated day which contains century information.

The method shown in FIG. 1 can be used to reformat any conventional, 3 field date format having a day field, a month field, and a year field. However, because many current databases have 6 digit date formats, additional steps such as truncating and a creating step may need to be performed before the inventive method may be used to yield a new 6 digit date format. Those steps will be described in further detail below. Further, a 7 digit or 8 digit format may be reformatted to yield a 6 digit date format with an accumulated century day, month, or combination thereof to comply with the format described herein.

FIG. 2 illustrates a method of extracting the century representation from the accumulated day after it has already been formatted according to FIG. 1. Again, most computers must perform the necessary functions which convert the numerical characters into usable computer data as shown. This extraction for the first embodiment 20 first sets the century representation to 19 as shown by first step 21. The next step 22 determines whether the century accumulated day is less than or equal to 31. If the 2 digit century accumulated day is less than 32, the century representation is set equal to 19 shown at another step 23. However, if the century accumulated day is greater than 31 and less than 63 the century accumulated day is decremented by 31 and the century representation is set at 20 as shown at yet another step 24. That step 24 is preformed again through loop 25 if the century accumulated day is greater than 62. Thus, the century accumulated day is effectively decremented by 62 and the century representation is set at 21. In the next step 26 the century representation is concatenated to the existing 2 digit year to yield a 4 digit year. The 4 digit year, the 2 digit month, and the new 2 digit day are combined in step 27 to create a 3 field, 8 digit date format.

EXAMPLE 1

In this example time is expanded by using the digits 32–93 in the day field. For example, the digits for the day fields have excess digits above 31, thus by using digits 32–63 and 64–95, two more centuries are obtained. One skilled in the art will note that these digits could be used in different sequence to expand for more time.

| FUTURE CENTURY e.g. 2000 | | |
|---|---|---|
| | OLD SYSTEM | NEW SYSTEM (Days use digits 32–63) |
| JAN. 1, 2000: | 01-01-00 | 01-32-00 |
| . | . | . |
| . | . | . |
| . | . | . |
| JAN. 31, 2000: | 01-31-00 First Year | 01-63-00 |
| . | . | . |
| . | . | . |
| . | . | . |
| DEC. 31, 2000: | 12-31-00 | 12-63-00 |
| . | . | . |
| . | . | . |
| . | . | . |
| DEC. 31, 2099: | 12-31-99 Last day of century | 12-63-99 |

| FUTURE CENTURY e.g. 2100 | | |
|---|---|---|
| | OLD SYSTEM | NEW SYSTEM (Days use digits 64–95) |
| JAN. 1, 2100: | 01-01-00 | 01-64-00 |
| . | . | . |
| . | . | . |
| . | . | . |
| JAN. 31, 2100: | 01-31-00 First Year | 01-95-00 |
| . | . | . |
| . | . | . |
| . | . | . |
| DEC. 31, 2100: | 12-31-00 | 12-95-00 |
| . | . | . |
| . | . | . |
| . | . | . |
| DEC. 31, 2199: | 12-31-99 Last day of century | 12-95-99 |

Figure 3:
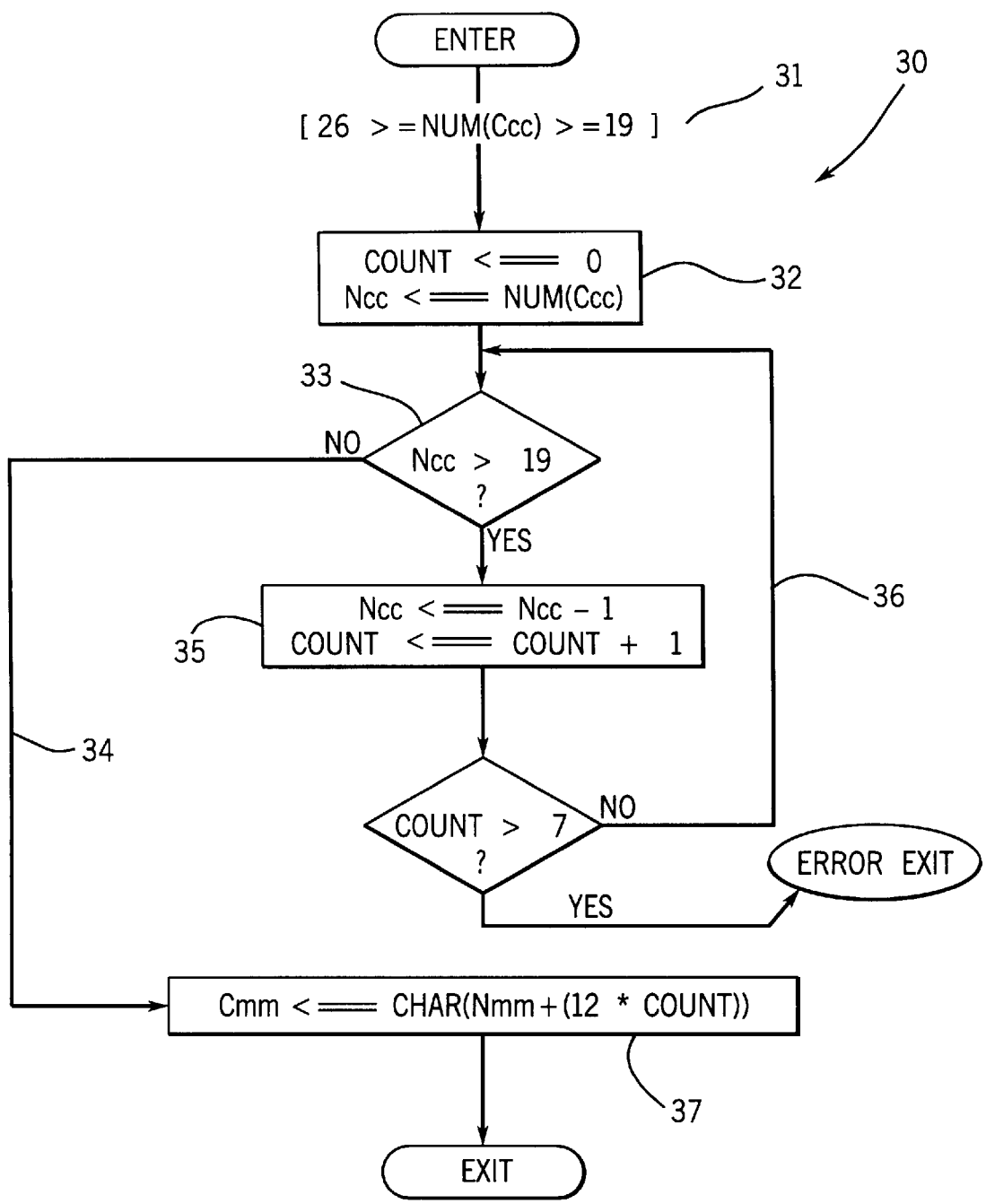
FIG. 3 is a flow chart of an insertion using the second embodiment of the present invention.
Figure 4:
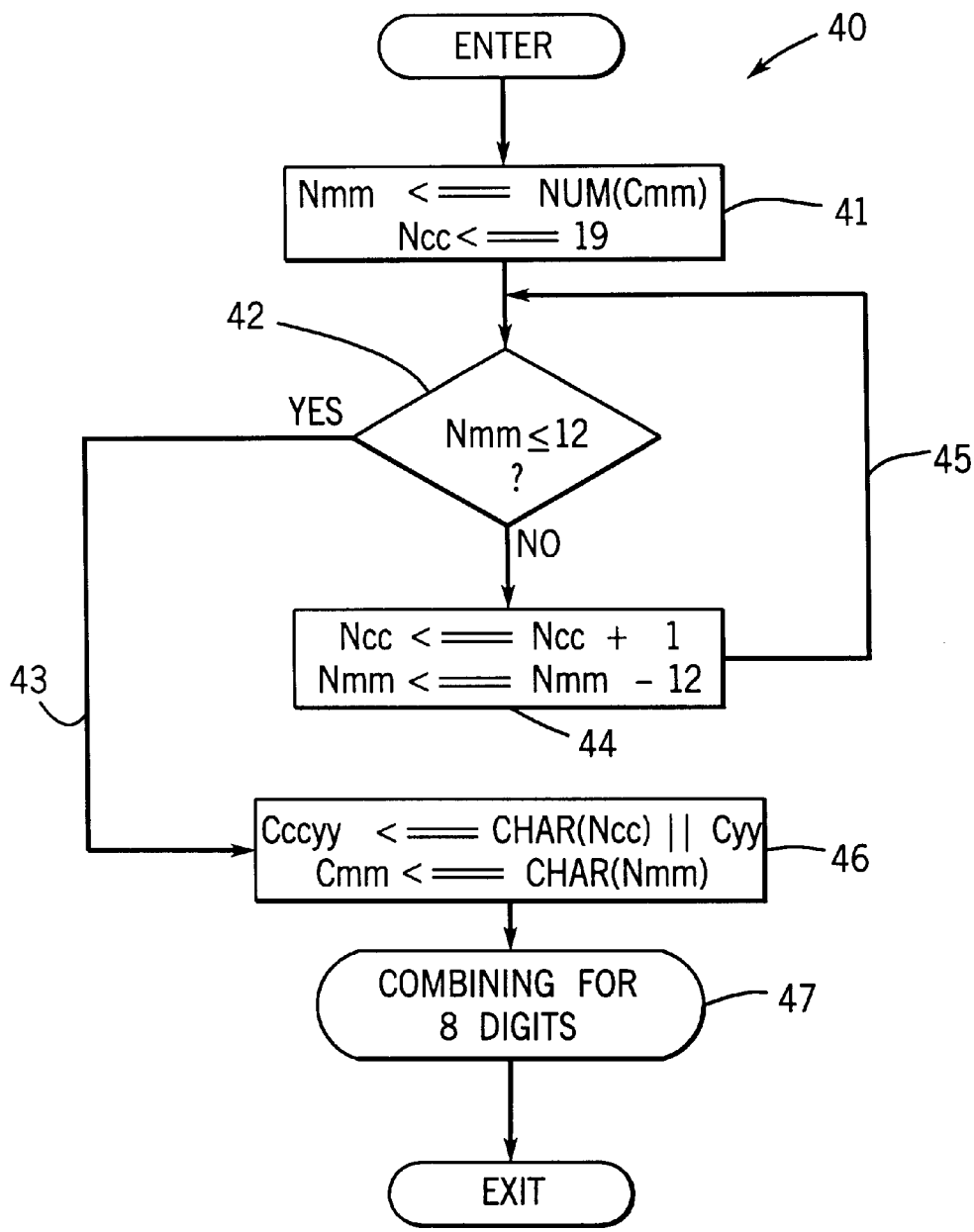
FIG. 4 is a flow chart of an extraction using the second embodiment of the present invention.

FIGS. 3 and 4 illustrate a second embodiment which accomplishes date insertion/extraction using month field as a century accumulator. Month of year ranges 1–12, 13–24, 25–36, 37–48, 49–60, 61–72, 73–84, 85–96 and for example count over months in the 20th thru 27th centuries. The century indicator and accumulator here is the position of the month field group in the 1–96 month total range. The position for the 20th century is 1–12, thus leaving current dates unchanged. Here the fixed month offset is therefore equal to 12.

In FIG. 3, the second embodiment insertion 30 is illustrated using a first step 31 which selects from the group {19, 20, 21, 22, 23, 24, 25, 26} or the 20th–27th centuries. A variable or count is set equal to zero in the next step 32, and once again the computer performs the necessary function on the character numerals. (For further reference, it will be assumed that the computer will perform the necessary functions on all the character numerals inputted into the inventive method so that the character numerals may be manipulated.) The next step 33 determines whether or not the century representation is greater than 19. If the century representation equals 19, the count remains equal to zero and path 34 is followed as shown. In the next step 35, if the century representation is greater than 19, the century representation from the year field is decremented by 1 and the count or variable is incremented by 1. The step is repeated by a loop 36 until the century equals 19 or the count is greater than seven. Next, a step 37 of multiplying the variable by a fixed month offset, for example 31, to get a product and then adding the product to the 2 digit month to create a 2 digit century accumulated month is performed. Additional steps, such as a truncating and creating step, must be performed to yield a century accumulated date with a 6 digit format as will be explained below.

FIG. 4 shows a method of extracting the date from the century accumulated month format after it has been reformatted according to FIG. 3. During the extraction 40, a first step 41 sets the century representation equal to 19 if the 2 digit month is less than 13. A path 43 is then followed as is illustrated. If the 2 digit accumulated century month is greater than 12, a next step 44 decrements the 2 digit century accumulated month by 12 and increments the century representation by 1. That step 44 is repeated by a loop 45 until the century accumulated month is less than 13. In a next step 46, the century representation is concatenated to the 2 digit year to get a 4 digit year. In a last step 47, the 4 digit year, the new 2 digit month, and the 2 digit day are combined to create a 3 field, 8 digit date format.

EXAMPLE 2

In this example time is expanded vertically by using digits 13–96 in the month field.

| CENTURY 2000 | | |
|---|---|---|
| | OLD SYSTEM (O) | NEW SYSTEM (NS) (Months use digits 13–24) |
| JAN. 1, 2000: | 01-01-00 | 13-01-00 |
| . | . | . |
| . | . | . |
| . | . | . |
| JAN. 31, 2000: | 01-31-00 First Year | 13-31-00 |
| . | . | . |
| . | . | . |
| . | . | . |
| DEC. 31, 2000: | 12-31-00 | 24-31-00 |
| . | . | . |
| . | . | . |
| . | . | . |
| DEC. 31, 2099: | 12-31-99 Last day of century | 24-31-99 |

CENTURY 2100

| | OLD SYSTEM | NEW SYSTEM (Months use digits 25–36) |
|---|---|---|
| JAN. 1, 2100: | 01-01-00 | 25-01-00 |
| . | . | . |
| . | . | . |
| . | . | . |
| JAN. 31, 2100: | 01-31-00 First Year | 25-31-00 |
| . | . | . |
| . | . | . |
| . | . | . |
| DEC. 31, 2100: | 12-31-00 | 36-31-00 |
| . | . | . |
| . | . | . |
| . | . | . |
| DEC. 31, 2199: | 12-31-99 Last day of century | 36-31-99 |

CENTURY 2200

| | OLD SYSTEM | NEW SYSTEM (Months use digits 37–48) |
|---|---|---|
| JAN. 1, 2200: | 01-01-00 | 37-01-00 |
| . | . | . |
| . | . | . |
| . | . | . |
| JAN. 31, 2200: | 01-31-00 First Year | 37-31-00 |
| . | . | . |
| . | . | . |
| . | . | . |
| DEC. 31, 2200: | 12-31-00 | 48-31-00 |
| . | . | . |
| . | . | . |
| . | . | . |
| DEC. 31, 2299: | 12-31-99 Last day of century | 48-31-99 |

CENTURY 2300

| | OLD SYSTEM | NEW SYSTEM (Months use digits 49–60) |
|---|---|---|
| JAN. 1, 2300: | 01-01-00 | 49-01-00 |
| JAN. 31, 2300: | 01-31-00 First Year | 49-31-00 |
| . | . | . |
| . | . | . |
| . | . | . |
| DEC. 31, 2300: | 12-31-00 | 60-31-00 |
| . | . | . |
| . | . | . |
| DEC. 31, 2399: | 12-31-99 Last day of century | 60-31-99 |

CENTURY 2400

| | OLD SYSTEM | NEW SYSTEM (Months use digits 61–72) |
|---|---|---|
| JAN. 1, 2400: | 01-01-00 | 61-01-00 |
| . | . | . |
| . | . | . |
| . | . | . |
| JAN. 31, 2400: | 01-31-00 First Year | 61-31-00 |
| . | . | . |
| . | . | . |
| . | . | . |
| DEC. 31, 2400: | 12-31-00 | 72-31-00 |
| . | . | . |
| . | . | . |
| . | . | . |
| DEC. 31, 2499: | 12-31-99 Last day of century | 72-31-99 |

CENTURY 2500

| | OLD SYSTEM | NEW SYSTEM (Months use digits 73–84) |
|---|---|---|
| JAN. 1, 2500: | 01-01-00 | 73-01-00 |
| . | . | . |
| . | . | . |
| JAN. 31, 2500: | 01-31-00 First Year | 73-31-00 |
| . | . | . |
| . | . | . |
| DEC. 31, 2500: | 12-31-00 | 84-31-00 |
| . | . | . |
| . | . | . |
| DEC. 31, 2599: | 12-31-99 Last day of century | 84-31-99 |

CENTURY 2600

| | OLD SYSTEM | NEW SYSTEM (Months use digits 85–96) |
|---|---|---|
| JAN. 1, 2600: | 01-01-00 | 85-01-00 |
| . | . | . |
| . | . | . |
| JAN. 31, 2600: | 01-31-00 First Year | 85-31-00 |
| . | . | . |
| . | . | . |
| DEC. 31, 2600: | 12-31-00 | 96-31-00 |
| . | . | . |
| . | . | . |
| DEC. 31, 2699: | 12-31-99 Last day of century | 96-31-99 |

Digits 97, 98 and 99 as presented here are not usable since 12 digits are needed for years and century. However, any sequence of digits between 13–99 could be used to expand time. One may chose the logical sequence starting at 13–24. Moreover, one also could imagine that time by this process could be further expanded by sequencing digits. Therefore, one could reverse this system so that decreasing digits could expand time for future centuries. An example of this could use digits 99–88 in decreasing order. Jan. 1, 2700 would become 99-01-00. As the dates decrease, already used dates are distinguished from one another by the sequence: increasing or decreasing. Sequencing digits 13–99 for the months would get another 700 years.

Figure 5:
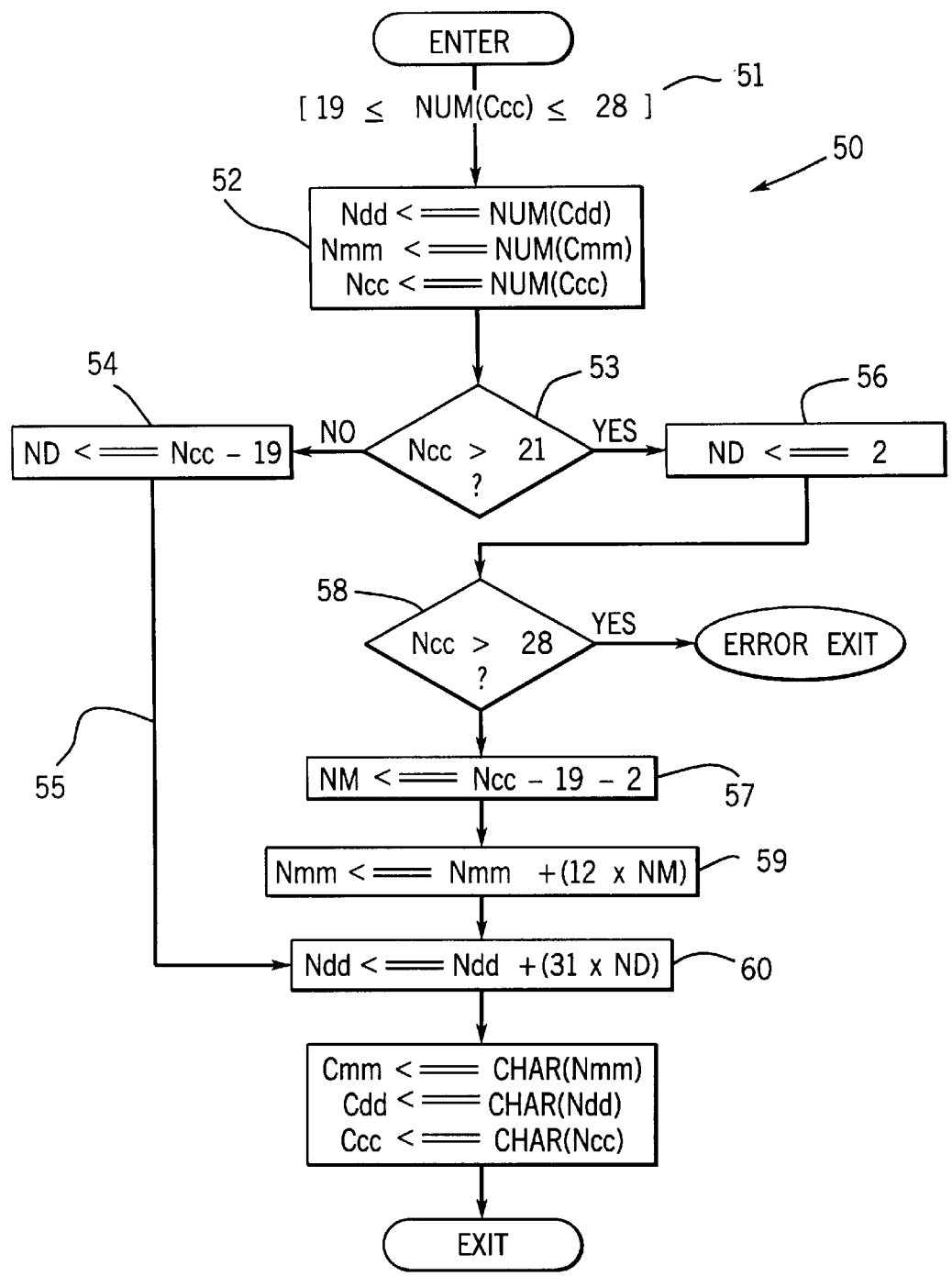
FIG. 5 is a flow chart of an insertion using the third embodiment of the present invention.
Figure 6:
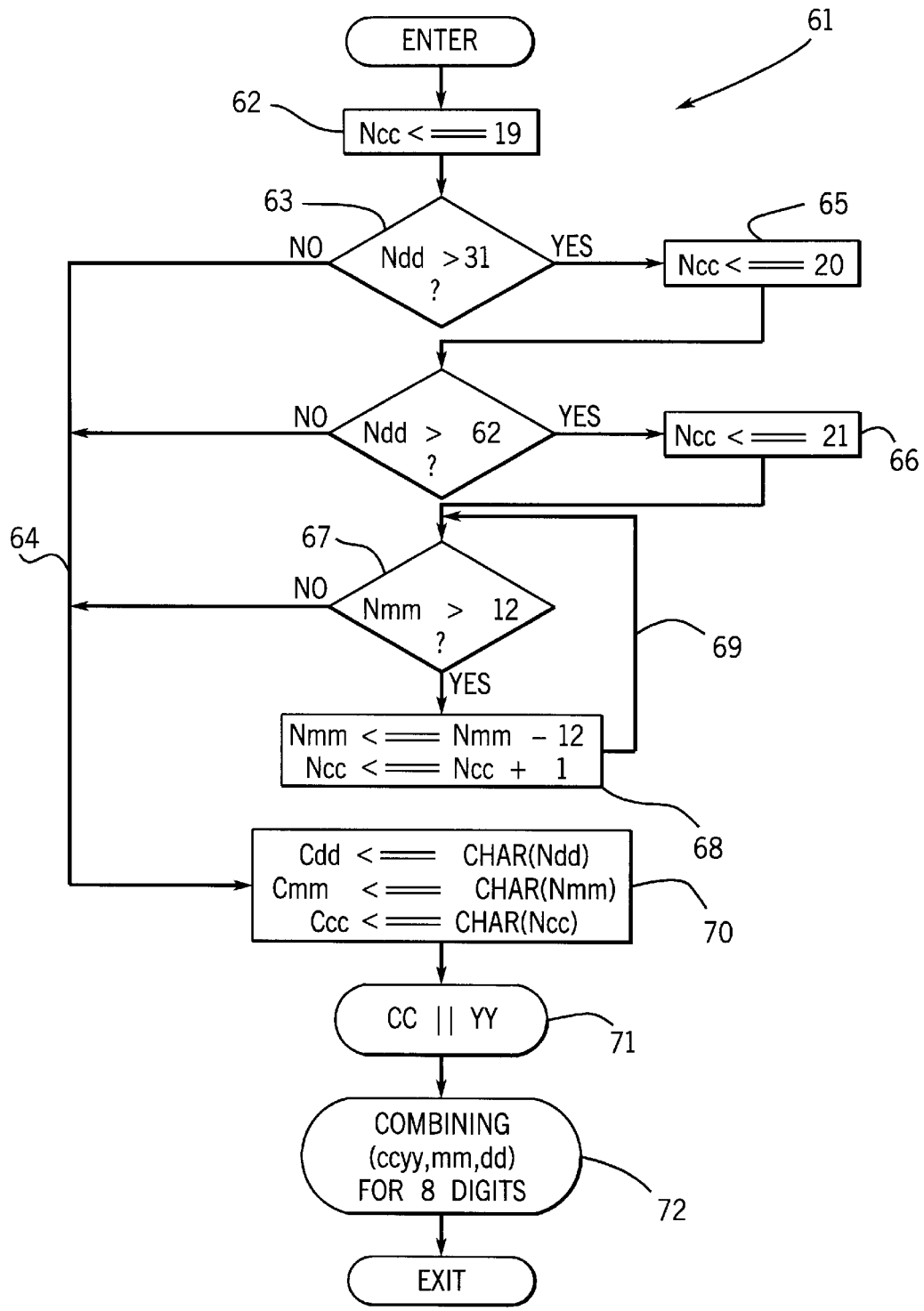
FIG. 6 is a flow chart of an extraction using the third embodiment of the present invention.

FIGS. 5 and 6 illustrate a third embodiment which accomplishes date insertion/extraction using day and month as a century accumulator combining the first and second embodiments described above. This embodiment counts first over the day field ranges 1–31, . . . , 63–93, then over the month field 13–24, 25–36, . . . , 85–96 to accommodate a total of ten consecutive centuries, for example the 20th–29th.

In this embodiment, time may be expanded by using the month digits 13–96 or 99–13 and using day digits 99–32. Once again, any combinations and sequences can be imagined. This embodiment expands time by 700 years and more for each combination of seven 12 month digits and each combination of 31 day digits. Thus, one can see that sequencing can extend time even further.

In FIG. 5, the third embodiment insertion 50 is illustrated using a field 51 which includes the 20th–29th centuries. Again the computer must perform certain internal functions 52 which convert the character representations of numbers to a usable computer format. A first step 53 determines whether the century representation is greater than 21. In a step 54, if the century representation is less than 22, a day variable (ND or Ndd) is set equal to a century representation from the year field decremented by 19 and the month variable (NM or Nmm) is set equal to zero. A path 55 is then followed. However, if the century representation is greater than 21, a next step 56 sets the day variable equal to 2. In a step 57, the month variable equal to the century representation decremented by 21. However, if the century representation is greater than 28, an error results and the routine terminates, as is illustrated by another step 58. Next, a step 59 is performed wherein, the month variable is multiplied by a fixed month offset 12 to get a first product, and the first product is then added to the 2 digit month to create a 2 digit century accumulated month. Next a step 60 is performed which multiplies the day variable by a fixed day offset, for example 31, to get a second product, and then adds the product to the 2 digit day to create a 2 digit century accumulated month. A truncating step is necessary in order to create a century accumulated 6 digit date format by combining the 2 digit century accumulated month, the 2 digit century accumulated day, and the 2 digit year, as will be detailed further below.

FIG. 6 illustrates how an extraction 61 may be performed on the third embodiment to extract an 8 digit format from the century accumulated month, century accumulated date, and the 2 digit year after an insertion 50 according to FIG. 5 has been performed. In the first step 62, in FIG. 6, the century representation is set equal to 19 as a starting base for the century representation. In the next step 63, a determination is made whether the 2 digit century accumulated day is less than 32. If it is, the century representation remains equal to 19 and a path 64 is followed. If the 2 digit century accumulated day is greater than 31 but less than 65, the century representation is set equal to 20 as shown in a step 65. If the 2 digit century accumulated day is greater than 62, the century representation is set equal to 21 as shown in a step 66. In a next step 67, a determination is made whether or not the century accumulated month is greater than 12. If the two digit century accumulated month is greater than 12, another step 68 decrements the century accumulated month by 12 and increments the century representation by one. This step is repeated by a loop 69 until the 2 digit century accumulated month is less than 13. In a next step 70, the character representations are converted by the computer NUM ( ) function into computer friendly representations. In another step 71, the century representation is concatenated to the 2 digit year to get a 4 digit year. Finally, in a last step 72, the 4 digit year, the 2 digit month, and the 2 digit day are combined to create a 3 field, 8 digit date format.

EXAMPLE 3

This example uses month digits 13–96 and day digits 32–63 to expand time.

First day of 700 years (future time): 13-32-00

Last day of 700 years (future time): 96-63-00

EXAMPLE 4

This example uses month digits 13–96 and day digits 64–95:

First day of second 700 years (future time): 13-64-00

Last day of second 700 years (future time): 96-95-00

Figure 7:
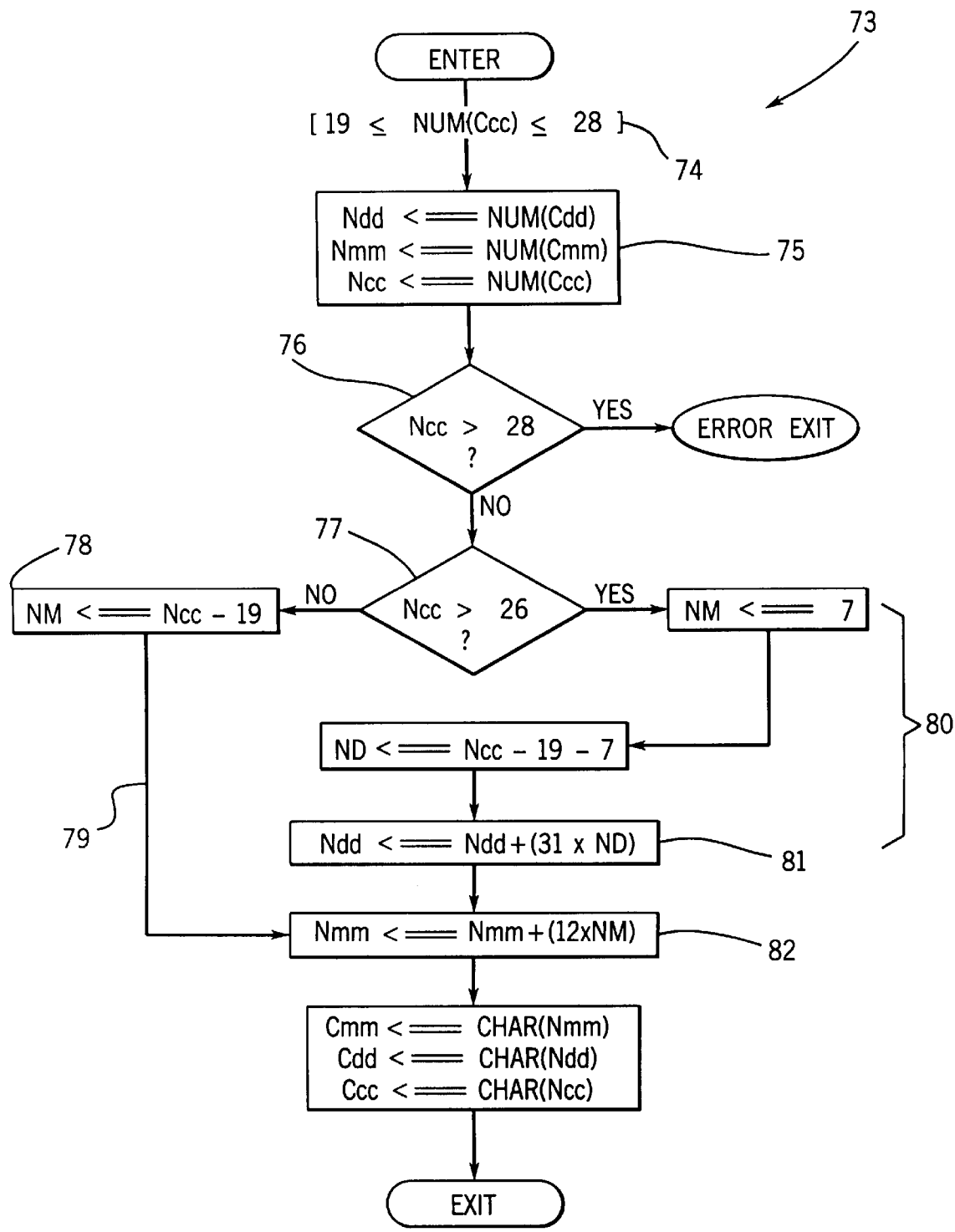
FIG. 7 is a flow chart of an insertion using the fourth embodiment of the present invention.
Figure 8:
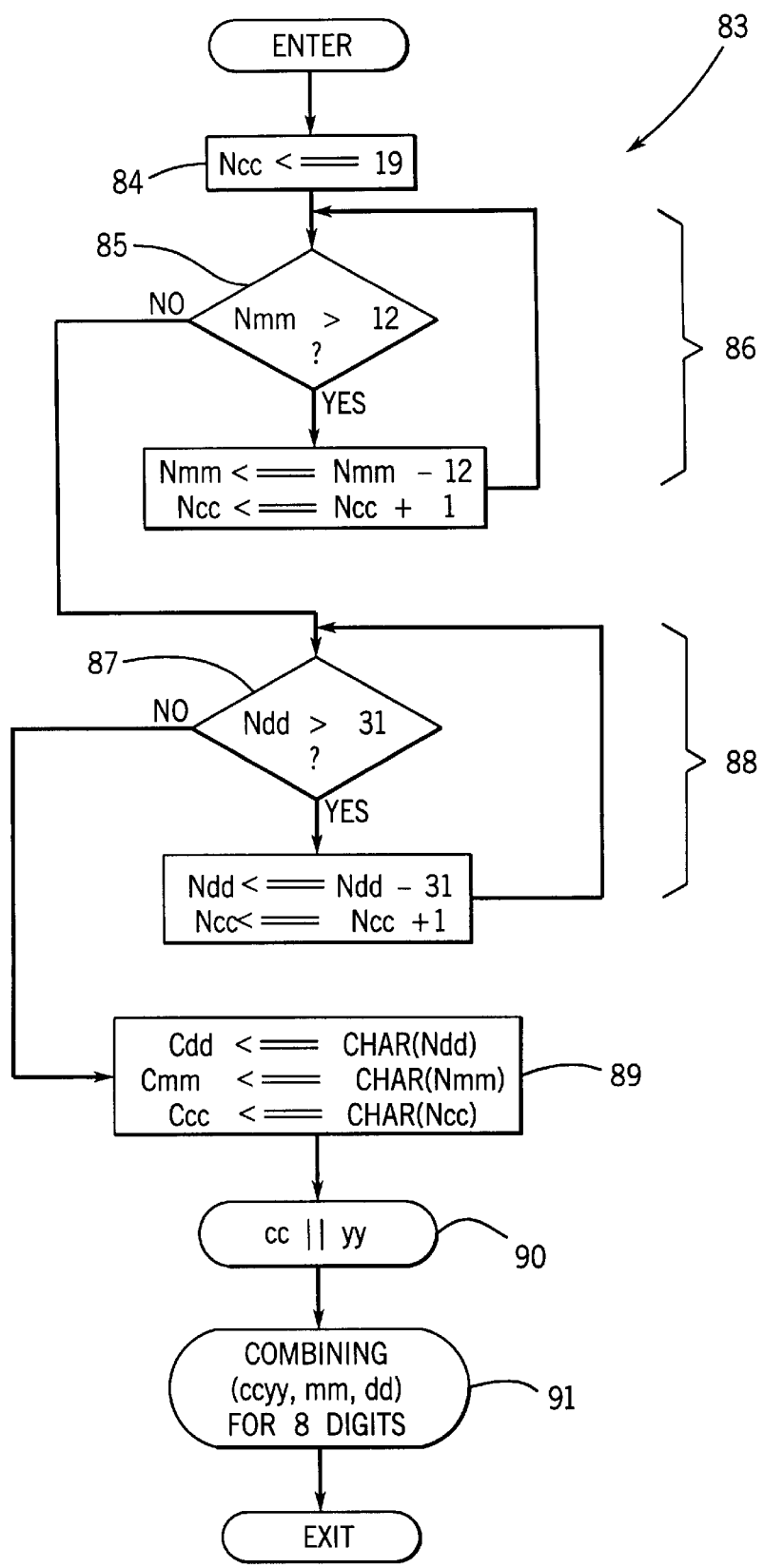
FIG. 8 is a flow chart of an extraction using the fourth embodiment of the present invention.

FIGS. 7 and 8 show yet another embodiment which accomplishes date insertion/extraction using month and day as a century accumulator the same as the third embodiment does, except in this fourth embodiment counting begins with the month field instead of the day field.

In this insertion 73, a field 74 consisting of the 20th through the 29th century is shown. Again, functions 75 are performed on the characters to convert them to computer numeric format. In a first step 76, a determination is made if a 2 digit century representation is greater than 28. If it is, an error results. In a next step 77, a determination is made whether or not the century representation is greater than 26. In a next step 78, a month variable (NM or Nmm) is set equal to the century representation decremented by 19. If the century representation is less than 27, a path 79 is then followed. If the century representation is greater than 26, the month variable (NM or Nmm) is set equal to 7. The day variable (ND or Ndd) is set equal to the century representation decremented by 26, i.e. (19-7), if the century representation is greater than 26. In a next step 81, the day variable is multiplied by a fixed day offset, for example 31, to get a second product, and the second product is added to the 2 digit day to create a 2 digit century accumulated day. In a following step 82, the month variable is multiplied by a fixed month offset, for example 12, to get a first product and then that product is added to the 2 digit month to create a 2 digit century accumulated month. An additional truncating step may be performed to create a century accumulated 6 digit date format as described below.

FIG. 8 illustrates an extraction method 83 for extracting a century accumulated date formatted in accordance with the method of insertion 73 of FIG. 7. The extraction 83 or extracting step includes a series of steps such as a first step 84 which sets a century representation equal to 19. The determination is then made in a next step 85 whether or not the 2 digit century accumulated month is greater than 12. A first loop 86 is performed which decrements the 2 digit century accumulated month by 12 and increments the century representation by 1 until the 2 digit century accumulated month is less than 13. In the next step 87, a determination is made whether the 2 digit century accumulated day is greater than 31. A second loop 88 is performed if the 2 digit century accumulated day is greater than 31 which increments the century representation by 1 and decrements the 2 digit century accumulated day by 31 until the 2 digit century accumulated day is less than 32. Additional computer functions 89 are performed on the numbers to get character representations from computer numeric format. In a step 90, the century representation is then concatenated to the 2 digit year to get a 4 digit year. Finally in a last step 91, the 4 digit year, a 2 digit month, and a 2 digit day are combined to create a 3 field, 8 digit date format.

Figure 9:
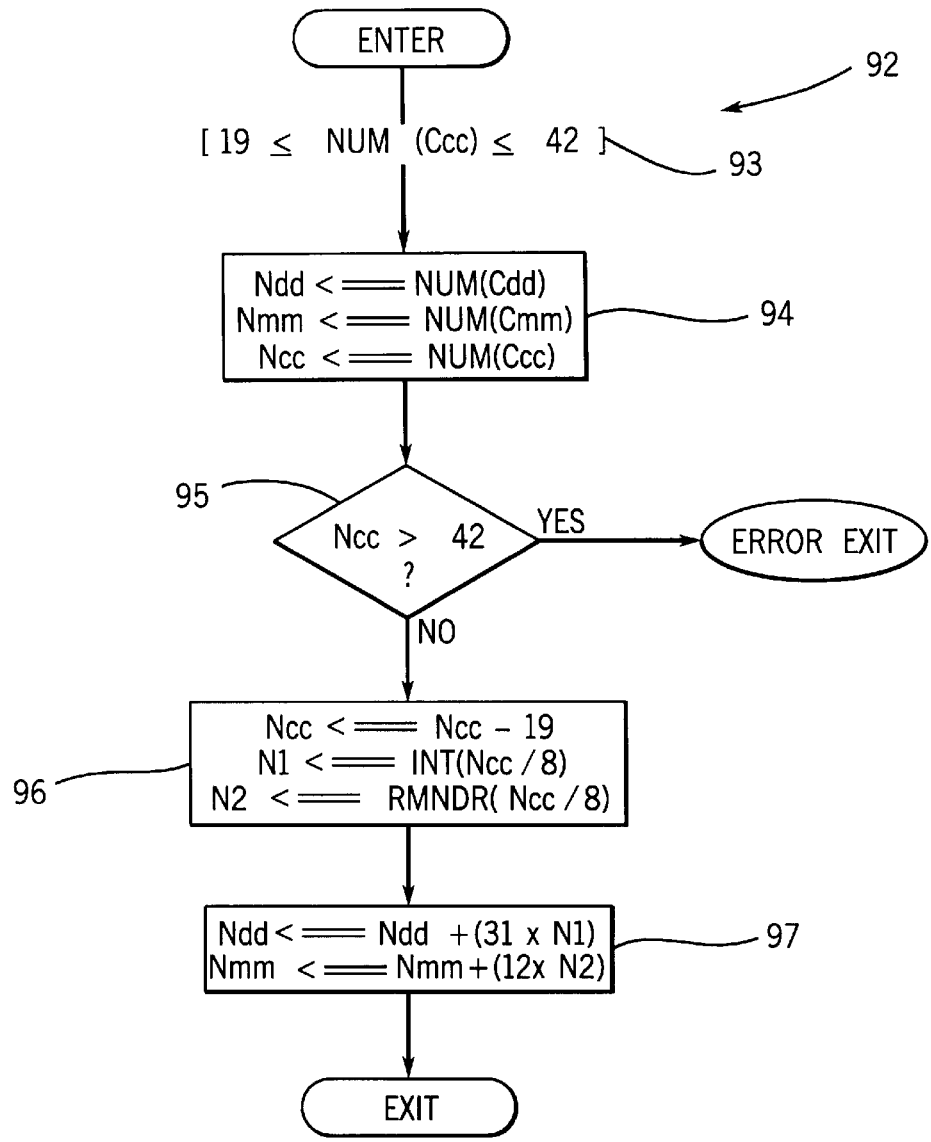
FIG. 9 is a flow chart of an insertion using the fifth embodiment of the present invention.
Figure 10:
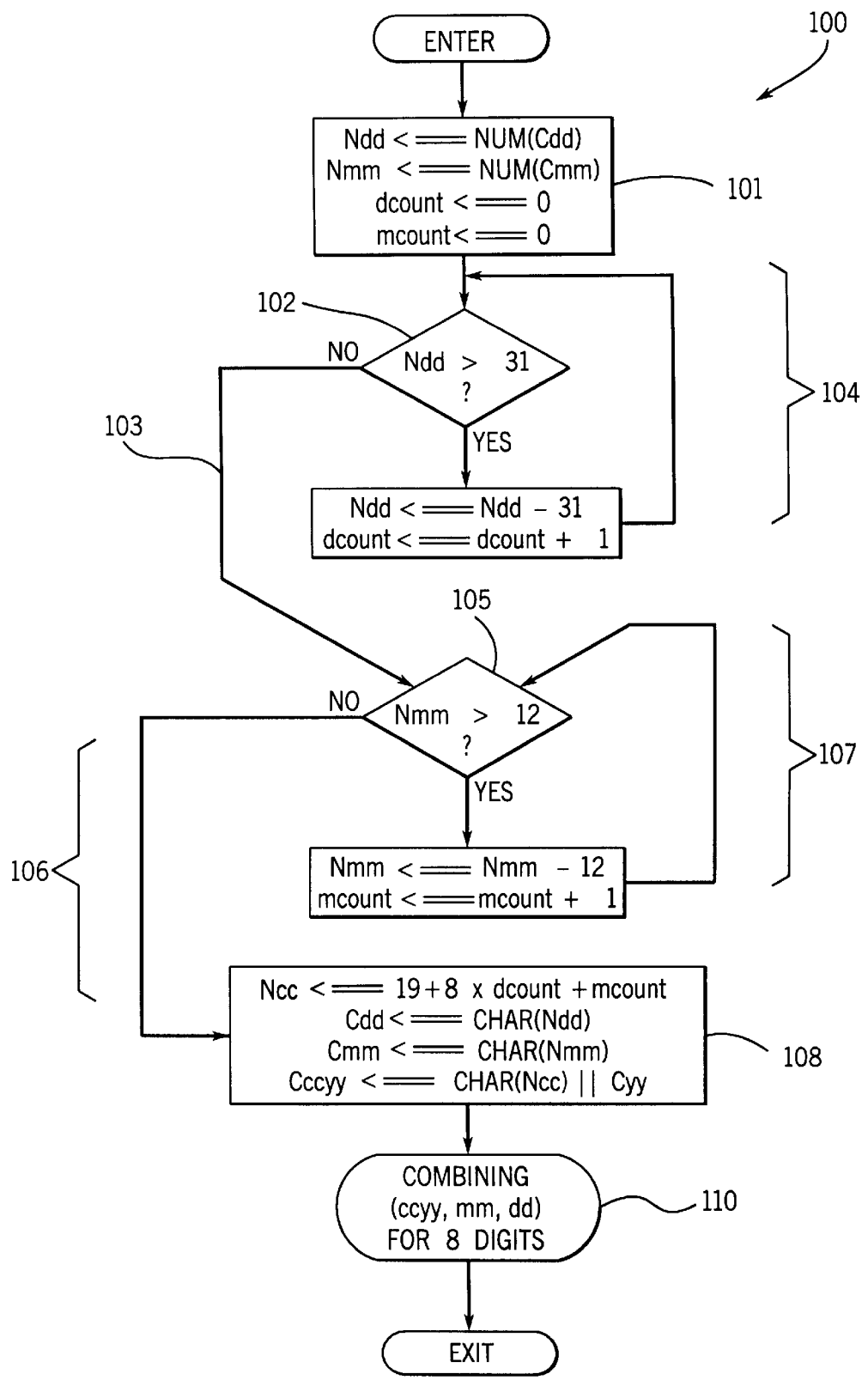
FIG. 10 is a flow chart of an extraction using the fifth embodiment of the present invention.

FIGS. 9 and 10 illustrate still another or fifth embodiment which accomplishes date insertion/extraction using the product of the month position multiplied by the day position as a century accumulator. This embodiment uses the formula 8×DFP+MFP+19=century, where DFP is day field position [0, 1, 2] and MFP is month field position [0, 1, 2, 3, 4, 5, 6, 7] for a total of 24 centuries, for example, the 20th through the 43rd.

In FIG. 9 this insertion 92 of the fifth embodiment of the present invention is shown using a century representation field 93 consisting of the 20th through the 43rd centuries. In step 94, computer functions, i.e. the NUM ( ) functions, are performed on the character representations by a computer to convert them to computer numeric format. A step 95 determines whether a century representation is greater than 42, and if it is, an error results and the routine terminates. If it is less than or equal to 42, a step 96 decrements the century representation from a year field by 19, sets a first variable (N1) equal to the integer portion of the century representation divided by 8, and sets a second variable (N2) equal to the remainder portion of the century representation divided by 8. As mentioned above, step 96 can be represented by the formula 8×DFP+MFP+19=Century or Century Representation. In another step 97, the first variable is multiplied by 31 to get a first product, and the first product is added to the 2 digit day. The second variable is then multiplied by 12 to get a second product which is then added to the 2 digit month. A truncating step usually follows if one desires to create a 6 digit date format as will be described in further detail below.

An extraction 100 can be performed on the century accumulated date format as shown in FIG. 10. In a first step 101 a day variable (dcount) and a month variable (mcount) are set equal to zero and the character representations (Cdd and Cmm) are converted to computer numeric format (Ndd and Nmm). In a next step 102, a determination is made whether the century accumulated day is greater than 31. If the century accumulated day is less than 32, path 103 is followed. If the 2 digit century accumulated day is greater than 31, loop 104 is performed which decrements the 2 digit century accumulated day by 31 and increments the day variable by 1 until the 2 digit century accumulated day is less than 32, in which case, path 103 is followed to a next step 105. A determination is then made whether the century accumulated month is greater than 12. If the century accumulated month is 12 or less, i.e. less than 13, path 106 is followed. If the century accumulated month is greater than 12, the century accumulated month is decremented by 12, and the month variable is incremented by 1 until the 2 digit month is less than 13. In a step 108, the day variable is multiplied by 8, then added to the month variable, and then incremented by 19. Also in step 108, the century representation is concatenated to the 2 digit year to get a 4 digit year. The 4 digit year is then combined with a 2 digit month and a 2 digit day to create a 3 field, 8 digit date format in a combining step 110.

Figure 11:
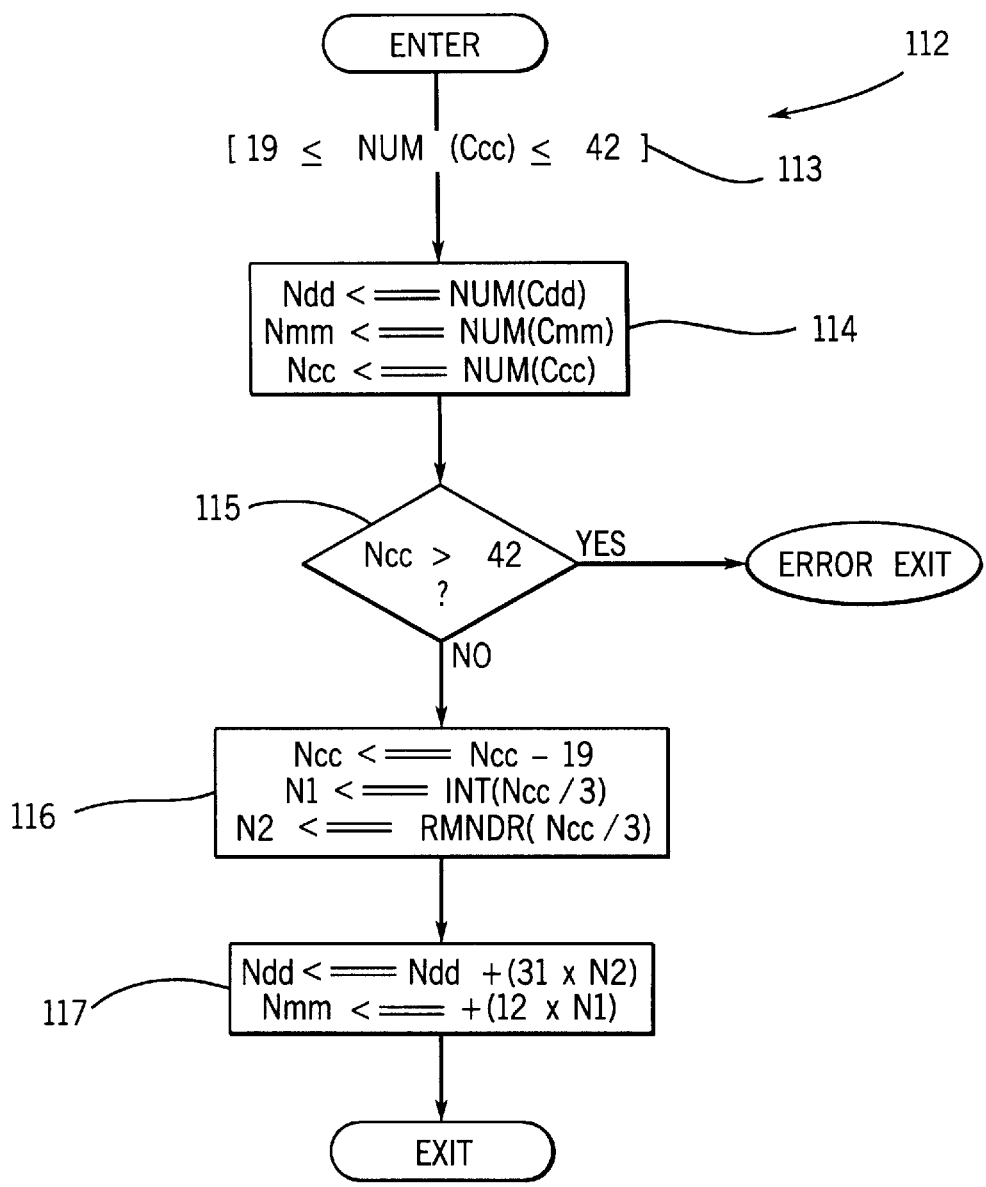
FIG. 11 is a flow chart of an insertion using the sixth embodiment of the present invention.
Figure 12:
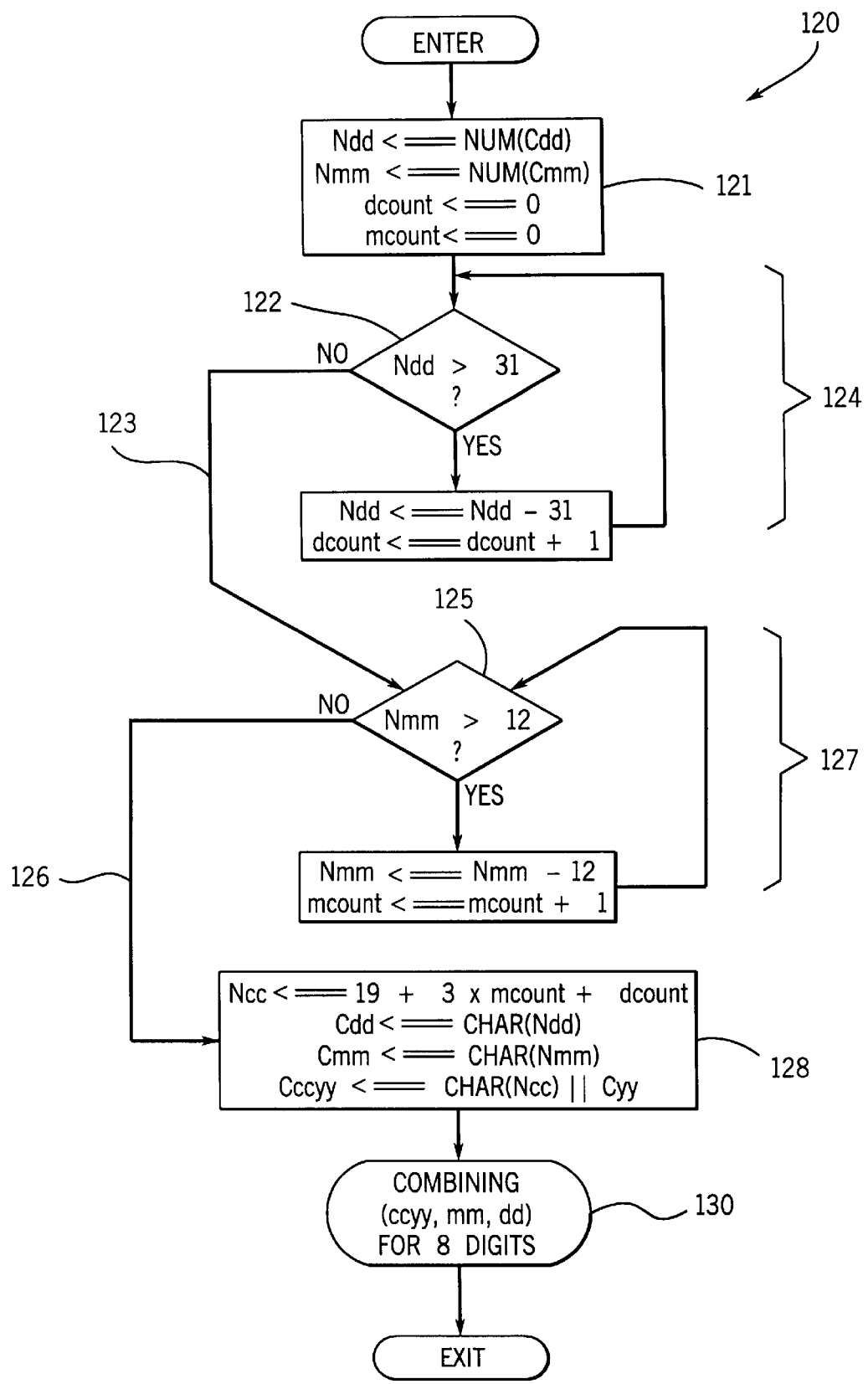
FIG. 12 is a flow chart of an extraction using the sixth embodiment of the present invention.

FIGS. 11 and 12 show another embodiment which accomplishes date insertion/extraction using the product of the day position and month position as a century accumulator much like the previous embodiment, but uses the formula 3×MFP+DFP+19=century.

In FIG. 11, another insertion method 112 of formatting a conventional, 3 field date format having a day field, a month field, and a year field is shown using a field 113 consisting of the 20th through the 43rd centuries. Again, NUM ( ) functions 114 are performed by the computer on the character representations of the numerals. In a first step 115, a determination is made whether the century representation is greater than 42. If it is, an error occurs and the method terminates. However, if the century representation is 42 or less, i.e. less than 43, a first step 116 is performed. Step 116 decrements the century representation from the year field by 19, sets a first variable (N1) equal to the integer portion of the century representation divided by 3, and sets a second variable (N2) equal to the remainder portion of a century representation divided by three. The next step 117 multiplies the second variable by 31 to get a first product, and adds the first product to a 2 digit day. In step 117, the first variable is multiplied by 12 to get a second product, and the second product is then added to a 2 digit month. As previously described, a truncating step and a step to combine the fields is assumed in order to create a century accumulated 6 digit date format by combining the 2 digit century accumulated month, the 2 digit century accumulated day, and the 2 digit year as will be described in further detail below.

FIG. 12 shows a method of extraction 120 in accordance with the method of insertion 112 of FIG. 11. A first step 121 sets the day variable (dcount) and a month variable (mcount) equal to zero and the character representations (Cdd and Cmm) are converted to a computer numeric format (Ndd and Nmm). In a next step 122, a determination is made whether the accumulated day is greater than 31. If the accumulated day is 31 or less, i.e. less than 32, path 123 is followed. However, if the century accumulated day is greater than 31 a loop 124 is performed wherein the 2 digit century accumulated day is decremented by 31 and the day variable is incremented by 1 until the 2 digit century accumulated day is less than 32 in which case path 123 is followed. In a next step 125, a determination is made whether the century accumulated month is greater than 12. If the century accumulated month is 12 or less, i.e. less than 13, then a path 126 is followed. However, if the century accumulated month is greater than 12, loop 127 is followed and the 2 digit century accumulated month is decremented by 12, and the month variable is incremented by 1 until the century accumulated month is less than 13. In a next step 128, the day variable is multiplied by 3 then incremented 19, and then added to the month variable. Also in step 128, the century representation is concatenated with the 2 digit year to get a 4 digit year. In a final step 130, the 4 digit year, the 2 digit month, and the 2 digit day are combined to create a 3 field, 8 digit date format.

Use and Operation

Figure 13:
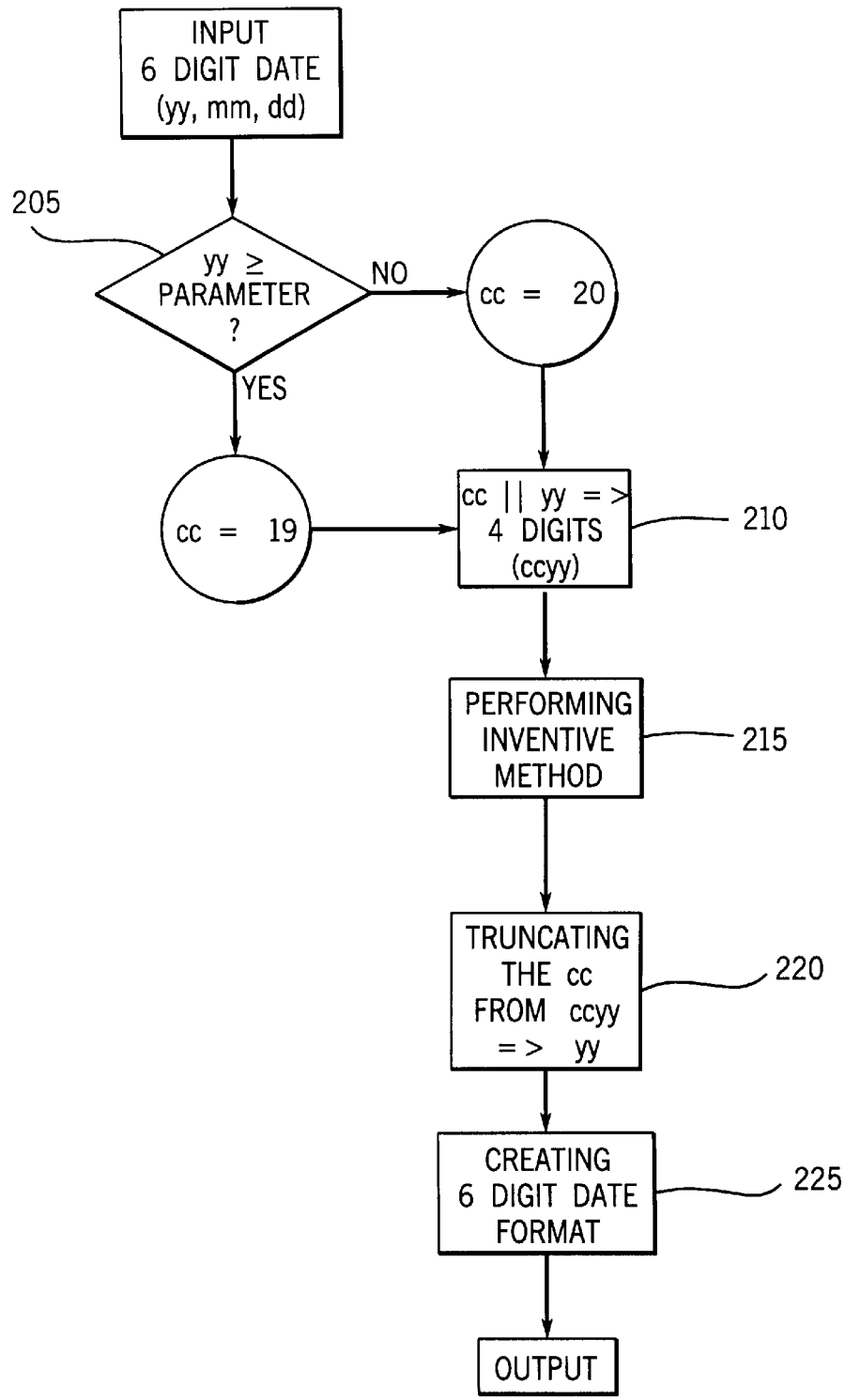
FIG. 13 is a flow chart illustrating one way of using the embodiments of the inventive method with a conventional 6 digit date format.

The inventive method may be used to create a 6 digit date representation or it may be used on existing date databases that already use 6 digits to represent dates, as illustrated in FIG. 13. When a new database is created, data entry clerks are intimately involved in the data entry process. For example, they can determine the century before entering the data and then enter the data in a 6 digit format using the present method. Alternatively, the clerks may enter the data in seven or eight digit format and then allow the inventive method to convert the data into a 6 digit format.

Using the inventive method on existing databases is somewhat more involved than just creating a database from scratch. For example, a database is simply a collection of records, much like a file cabinet containing folders. Each record contains fields referring to specific kinds of information; similarly, each folder contains one or more pages. In most older database management systems (DBMS), the records and the fields within them are fixed length. This means that if more space is needed by one or more fields, the entire database has to be saved (downloaded) into another file (usually ASCII) so that the field length(s) or record format(s) can be adjusted. Then the downloaded file can be uploaded back into the new database structure. Newer DBMS support variable length records and fields.

The present method for reformatting a conventional date format to accommodate a century is well suited to a fixed format structure. However, the problem of determining the century for 6 digit dates in an existing database still remains. For example, if it is known that ambiguous dates have already been entered, it is difficult to determine which 6 digit dates are actually in the 21st century and which are in the 20th. Resolving this can be done by applying methods that yield the highest probability of being correct for each different 6 digit date. Of course, this subjective approach can be totally avoided if no 21st century date data were ever allowed into a database or an arbitrary cut-off date is "capable" of accommodating that data.

Another way to correct this problem is to enable the DBMS to maintain a log of all input; some DBMS are equipped with that function. From this log it is possible to obtain information sufficient either to decide the correct century for the date or to access original input forms from which an exact date may be obtained. This manual approach of correcting previously entered ambiguous dates may occasionally be unacceptable because of the enormity of the task.

In order to change any particular fixed length or variable length field formats in the records of a database (e.g. the format of all dates), procedures must be established to ensure that data entry continuity into the current database is maintained while a new database and associated program for storing/retrieving data into/from that database are developed and tested. The following suggested guidelines for employing those procedures will ensure that the transformation will take place successfully. A worst case assumption herein addressed is that dates in the 21st century have already been entered into the current database as ambiguous items.

Guidelines for changing record field formats in an operational database are as follows:

First, enable the DBMS's facility for logging all manual input which saves the data entered at any terminal to a separate file for subsequent off-line viewing. Alternatively, one must direct data entry clerks to manually record, on paper, a log of 21st century dates entered if the DBMS does not support data logging. This procedure will reduce the number of ambiguous dates needing correction later, since a record of all correct date data and the time it was entered will be maintained from this point forward.

Next, copy the active database and DBMS software to another computer for development and testing. Reprogram the date storage and retrieval systems as per flowcharts of the present invention. Then debug these new programs using the database copy as a test vehicle. (Note, in the case of the inventive date format, there is no change in the contents of any date field before the year 2000.)

Then obtain a second copy of the active database (which we will call the off-line database) and its log of all entries to that point. Allow the active database to continue in operation, maintaining a second log file (or manual entry log sheets) beginning where the first log ended. Update the offline database with any dates indicated by the first log file (or manual entry log sheets) to be after the year 2000.

Backup the active database and immediately copy the offline database directly over the old active one, which then continues as the new active database except that it is closer to being completely updated with the correct dates.

Next, manually re-enter the remaining corrected 21st century dates into this final database from the second log file (or manual entry log sheets).

Finally, run appropriate date correcting programs against the database to discover and resolve any remaining ambiguities.

Some databases purposely lockout data from centuries other than the 20th Century. Since these databases prevent contamination by data from other centuries the problems associated with determining the appropriate century never arises. Of course, one skilled in the art will see that several variations on this and other schemes mentioned herein are also possible.

Another alternative would be to assume that all data in the 6 digit format which has a 2 digit year greater than or equal to a predetermined parameter has a century representation equal representation equal to 19. All 2 digit years less than the predetermined parameter would have a century representation equal to 20. For example, if the predetermined parameter is set at 60 and the 2 digit year is greater than or equal to 60, the century representation is set equal to 19. All 2 digit years in the database that are less than 60 would have century representations set equal to 20. This may be referred to as a sliding century format.

FIG. 13 illustrates one way to reformat a 6 digit date using the present invention. In FIG. 13, one can see that the century representation (cc) may be determined, for example, by using a predetermined parameter step 205. If the year (yy) is greater than or equal to a predetermined parameter, the century representation (cc) equals 19. If the year (yy) is less than the predetermined parameter, the century representation (cc) equals 20. The century representation (cc) must then be concatenated with the 2 digit year (yy) in the year field as shown in step 210. This must occur before the inventive method 215 is performed on the date format. After the inventive method is performed, the century representation is truncated from the 4 digit year in the year field to leave a 2 digit year as shown by step 220. Thus, a new 6 digit century accumulated date format is created by step 225. The century can be determined by further analyzing either the century accumulated day, month, or both day and month, through a series of extraction steps as discussed above.

In the above detailed description, it will be seen that this invention may be adapted to obtain all ends and objects herein set forth, together with other advantages which are obvious and which are inherent. It will also be understood that certain features and sub-combinations are of utility and may be employed without reference to other features and sub-combinations. This is contemplated by and is within the scope of the claims. As many possible embodiments may be made of the invention without departing from the scope thereof, it is to be understood that all matter herein set forth and shown in the accompanying drawings, is to be interpreted as illustrative and not in a limiting sense.

What is claimed is:

1. A method of reformatting a conventional, three field date format having a day field, a month field, and a year field comprising the steps of:

(1) setting a variable equal to zero;

(2) decrementing a century representation from the year field by one and incrementing the variable by one when the century representation from the year field is greater than 19;

(3) repeating step (2) until the century representation equals 19;

(4) multiplying the variable by a fixed day offset to get a product;

(5) adding the product to a 2 digit day to create a 2 digit century accumulated day;

(6) truncating the 2 century representation digits of a 4 digit year to form a 2 digit year; and (7) creating a century accumulated 6 digit date format by combining the 2 digit century accumulated day, a 2 digit month, and the 2 digit year.

2. The method of claim 1, further comprising the step of determining the century representation from a group consisting of {19,20,21}.

3. The method of claim 2 further comprising the steps of:

setting the century representation equal to 19 if the 2 digit year is greater than or equal to a predetermined parameter; and setting the century representation equal to 20 if the 2 digit year is less than the predetermined parameter.

4. The method of claim 3, further comprising the step of concatenating the century representation with the 2 digit year of the conventional 6 digit date format to form an 8 digit date format with a 4 digit year field, a 2 digit month field, and a 2 digit day field.

5. The method of claim 1, further comprising an extracting step including the steps of:

setting the century representation equal to 19 if the 2 digit century accumulated day is less than 32;

decrementing the century accumulated day by 31, and setting the century representation equal to 20 if the 2 digit century accumulated day is greater than 31 but less than 63;

decrementing the century accumulated day by 62 and setting the century representation equal to 21 if the 2 digit century accumulated day is greater than 62;

concatenating the century representation with the 2 digit year to get a 4 digit year; and combining the 4 digit year, the 2 digit month, and the 2 digit day to create a three field, 8 digit date format.

6. A method of reformatting a conventional, three field date format having a day field, a month field, and a year field comprising the steps of:

(1) setting a variable equal to zero;

(2) decrementing a century representation from the year field by one and incrementing the variable by one when the century representation is greater than 19;

(3) repeating step (2) until the century representation equals 19;

(4) multiplying the variable by a fixed month offset to get a product;

(5) adding the product to a 2 digit century accumulated month;

(6) truncating the 2 century representation digits of a 4 digit year to form a 2 digit year; and (7) creating a century accumulated 6 digit date format by combining the 2 digit century accumulated month, the 2 digit day, and the 2 digit year.

7. The method of claim 6 further comprising the step of determining the century representation from a group consisting of {19, 20, 21, 22, 23, 24, 25, 26}.

8. The method of claim 7, further comprising the steps of:

setting the century representation equal to 19 if the 2 digit year is greater than or equal to a predetermined parameter; and setting the century representation equal to 20 if the 2 digit year is less than the predetermined parameter.

9. The method of claim 8, further comprising the step of concatenating the century representation with the 2 digit year of the conventional 6 digit date format to form an 8 digit date format with a 4 digit year, a 2 digit month, and a 2 digit day.

10. The method of claim 6, further comprising an extracting step including the steps of:

(1) setting the century representation equal to 19 if the 2 digit month is less than 13;

(2) decrementing the 2 digit century accumulated month by 12 and incrementing the century representation by one if the 2 digit century accumulated month is greater than 12;

(3) repeating step (2) until the century accumulated month is less than 13;

(4) concatenating the century representation with the 2 digit year to get a 4 digit year; and (5) combining the 4 digit year, the 2 digit month, and the 2 digit day to create a three field, 8 digit date format.

11. The method of reformatting a conventional, three field date format having a day field, a month field, and a year filed comprising the steps of:

setting a day variable equal to a century representation from the year field decremented by 19 and the month variable equal to zero if the century representation is less than 22;

multiplying the day variable by a fixed day offset to get a first product;

adding the first product to a 2 digit day to create a 2 digit century accumulated day;

multiplying the month variable by a fixed month offset to get a second product;

adding the product to a 2 digit month to create a 2 digit century accumulated month;

truncating the 2 century representation digits of a 4 digit year to form a 2 digit year; and creating a century accumulated 6 digit date format by combining the 2 digit century accumulated month, the 2 digit century accumulated day, and the 2 digit year.

12. A method of claim 1, further the comprising the step of setting a day variable equal to 2 and a month variable equal to the century representation decremented by 21 if the century representation is greater than 21.

13. The method of claim 12, further comprising the step of determining the century representation from a group consisting of {19, 20, 21, 22, 23, 24, 25, 26, 27, 28}.

14. The method of claim 13, further comprising the steps of:

setting the century representation equal to 19 if the 2 digit year is greater than or equal to a predetermined parameter; and setting the century representation equal to 20 if the 2 digit year is less than the predetermined parameter.

15. The method of claim 14, further comprising the steps of concatenating the century representation with the 2 digit year of the conventional 6 digit date format to form an 8 digit date format with a 4 digit year, a 2 digit month, and a 2 digit day.

16. The method of claim 11, further comprising an extracting step including the steps of:

(1) setting the century representation equal to 19 if the century accumulated day is less than 32;

(2) setting the century representation equal to 20 if the century accumulated day is greater than 31 but less than 63;

(3) setting the century representation equal to 21 if the 2 digit century accumulated day is greater than 62;

(4) decrementing the 2 digit century accumulated month by 12 and incrementing the century representation by one if the 2 digit century accumulated month is greater than 12;

(5) repeating step (4) until the 2 digit century accumulated month is less than 13;

(6) concatenating the century representation with the 2 digit year to get a 4 digit year; and (7) combining the 4 digit year, the 2 digit month, and the 2 digit day to create a 3 field, 8 digit date format.

17. A method of reformatting a conventional, three field date format having a day field, a month field, and a year field comprising the steps of:

setting a month variable equal to a century representation decremented by 19 if a century representation is less than 27;

multiplying the month variable by a fixed day offset to get a first product;

adding the first product to a 2 digit month to create a 2 digit century accumulated month;

multiplying the day variable by a fixed day offset to get a second product; and adding the second product to a 2 digit day to create a 2 digit century accumulated day;

truncating the 2 century representation digits of a 4 digit year to create a 2 digit year; and creating a century accumulated 6 digit date format by combining the 2 digit century accumulated month, the 2 digit century accumulated day, and the 2 digit year.

18. The method of claim 17, further comprising the step of determining the century representation from a group consisting of {19, 20, 21, 22, 23, 24, 25, 26, 27, 28}.

19. The method of claim 18, further comprising the steps of:

setting the century representation equal to 19 if the 2 digit year is greater than or equal to a predetermined parameter; and setting the century representation equal to 20 if the 2 digit year is less than the predetermined parameter.

20. The method of claim 19, further comprising the step of concatenating the century representation with the 2 digit year of the conventional 6 digit date format having a 2 digit year, a 2 digit month, and a 2 digit day to form an 8 digit date format with a 4 digit year, a 2 digit month, and a 2 digit day.

21. The method of claim 17, further comprising the step of setting a month variable equal to 7 and the day variable equal to the century representation decremented by 26 if the century representation is greater than 26.

22. The method of claim 17, further comprising an extracting step.

23. The method of claim 22, wherein the extracting step includes the steps of:

setting the century representation equal to 19 if the 2 digit month is less than 13;

concatenating the century representation to the 2 digit year; and combining the 4 digit year, a 2 digit month, and a 2 digit day to create a 3 field, 8 digit date format.

24. The extraction step of claim 23, further comprising the steps of:

(1) decrementing the 2 digit century accumulated month by 12 and incrementing the century representation by one if the 2 digit century accumulated month is greater than 12; and (2) repeating step (1) until the 2 digit century accumulated month is less than 13.

25. The extraction step of claim 24, further comprising the steps of:

(1) incrementing the century representation by one and decrementing the 2 digit century accumulated day by 31 if the 2 digit century accumulated day is greater than 31; and (2) repeating step (1) until the 2 digit century accumulated day is less than 32.

26. A method of reformatting a conventional, three field date format having a day field, a month field, and a year field comprising the steps of:

decrementing a century representation from the year field by 19 if the century representation is less than 43;

setting a first variable equal to the integer portion of the century representation divided by 8;

setting a second variable equal to the remainder portion of the century representation divided by 8;

multiplying the first variable by 31 to get a first product;

adding a 2 digit day to the first product;

multiplying the second variable by 12 to get a second product;

adding a 2 digit month to the second product;

truncating the 2 century representation digits of a 4 digit year to crate a 2 digit year; and creating a century accumulated 6 digit date format by combining a 2 digit century accumulated month, the 2 digit century accumulated day, and the 2 digit year.

27. The method of claim 26, further comprising the step of determining the century representation from a group consisting of {19 through 42}.

28. The method of claim 27, further comprising the steps of:

setting the century representation equal to 19 if the 2 digit year is greater than or equal to a predetermined parameter; and setting the century representation equal to 20 if the 2 digit year is less than the predetermined parameter.

29. The method of claim 28, further comprising the step of concatenating the century representation with the 2 digit year of the conventional 6 digit date format to form an 8 digit date format with a 4 digit year field, a 2 digit month field, and a 2 digit day field.

30. The method of claim 26, further comprising an extracting step including the steps of:

(1) setting a day variable equal to zero and a month variable equal to zero;

(2) decrementing the 2 digit century accumulated day by 31 and incrementing the day variable by one if the 2 digit century accumulated day is greater than 31;

(3) repeating step (2) until the 2 digit century accumulated day is less than 32;

(4) multiplying the day variable by 8, then adding 19 and then adding the month variable;

(5) concatenating the century representation with the 2 digit year to get a 4 digit year; and (6) combining the 4 digit year, the 2 digit month, and the 2 digit day to create a 3 field, 8 digit date format.

31. The extraction step of claim 30, further comprising the steps of:

(1) decrementing the 2 digit century accumulated month by 12 and incrementing the month variable by one if the 2 digit century accumulated month is greater than 12; and (2) repeating step (1) until the 2 digit month is less than 13.

32. A method of reformatting a conventional, three field date format having a day field, a month field, and a year field comprising the steps of:

decrementing century representation from the year field by 19 if the century representation of a 4 digit year is less than 43;

setting a first variable equal to the integral portion of the century representation divided by 3;

setting a second variable equal to the remainder portion of the century representation divided by 3;

multiplying the second variable by 31 to get a first product;

adding a 2 digit day to the first product;

multiplying the first variable by 12 to get a second product;

adding a 2 digit month to the second product;

truncating the first 2 digits of the 4 digits year to create a 2 digit year; and creating a century accumulated 6 digit date format by combining the 2 digit century accumulated month, the 2 digit century accumulated day, and the 2 digit year.

33. The method of claim 32, further comprising the step of determining the century representation from a group consisting of {19 through 42}.

34. The method of claim 33, further comprising the steps of:

setting the century representation equal to 19 if the 2 digit year is greater than or equal to a predetermined parameter; and setting the century representation equal to 20 if the 2 digit year is less than the predetermined parameter.

35. The method of claim 34, further comprising the step of concatenating the century representation with the 2 digit year of the conventional 6 digit date format to form an 8 digit date format with a 4 digit year field, a 2 digit month field, and a 2 digit day field.

36. The method of claim 32, further comprising an extracting step including the steps of, (1) setting a day variable equal to zero and a month variable equal to zero;

(2) decrementing the 2 digit century accumulated day by 31 and incrementing the day variable by one if the 2 digit century accumulated day is greater than 31;

(3) repeating step (2) until the 2 digit century accumulated day is less than 32;

(4) multiplying the day variable by 3, then adding, 19 and then adding the month variable;

(5) concatenating the century representation with the 2 digit year to get a 4 digit year; and (6) combining the 4 digit year, the 2 digit month, and the 2 digit day to create a 3 field, 8 digit date format.

37. The extraction step of claim 32, further comprising the steps of:

(1) decrementing the 2 digit century accumulated month by 12 and incrementing the month variable by one if the 2 digit century accumulated month is greater than 12; and (2) repeating step (1) until the 2 digit century accumulated month is less than 13.

* * * * *